(12) United States Patent
Zacher

(10) Patent No.: US 10,945,809 B2
(45) Date of Patent: Mar. 16, 2021

(54) PROSTHODONTIC TOOL AND METHOD FOR PLACING AND FITTING CROWNS AND INLAYS

(76) Inventor: Mike Zacher, Phoenix, AZ (US)

( * ) Notice: Subject to any disclaimer, the term of this patent is extended or adjusted under 35 U.S.C. 154(b) by 0 days.

(21) Appl. No.: 13/199,536

(22) Filed: Sep. 1, 2011

(65) Prior Publication Data

US 2013/0059270 A1 Mar. 7, 2013

(51) Int. Cl.
*A61C 3/00* (2006.01)

(52) U.S. Cl.
CPC ...................... *A61C 3/00* (2013.01)

(58) Field of Classification Search
CPC .......... A61C 3/00; A61C 19/006; A61C 13/12
USPC .......... 433/49, 141, 163; 206/63.5; 224/217; 602/54; 294/212; 2/21; 63/1.12
See application file for complete search history.

(56) References Cited

U.S. PATENT DOCUMENTS

| | | |
|---|---|---|
| 3,283,888 A | 11/1966 | Scott |
| 3,985,383 A | 10/1976 | Yonkers |
| 4,512,601 A | 4/1985 | Jacobstein |
| 5,251,943 A * | 10/1993 | Dalbo et al. .................. 294/212 |
| 5,256,064 A * | 10/1993 | Riihimaki et al. ............ 433/141 |
| 5,320,533 A | 6/1994 | Lee |
| 5,348,153 A | 9/1994 | Cole |
| 5,525,059 A | 6/1996 | Lee |
| 5,851,114 A | 12/1998 | Lee |
| 6,115,958 A | 9/2000 | Enderle |
| 6,972,141 B1 * | 12/2005 | Bries ......................... C09J 7/02 24/306 |
| 6,986,924 B2 | 1/2006 | Croll |
| 2005/0154166 A1 * | 7/2005 | Husemann et al. .......... 526/319 |
| 2005/0260539 A1 * | 11/2005 | Croll ............................. 433/163 |
| 2007/0181620 A1 * | 8/2007 | Carver, III ........... A44C 9/0053 224/217 |
| 2008/0167680 A1 | 7/2008 | Voegele et al. |

* cited by examiner

*Primary Examiner* — Edward Moran
(74) *Attorney, Agent, or Firm* — Venjuris, P.C.

(57) ABSTRACT

A device for preparing, fitting, and placing periodontal prosthodontics having a finger covering and an attached bilayered adhesive patch, wherein the bilayered adhesive patch comprises two separable layers joined by a weak adhesive and one external side of the bilayered adhesive patch is attached by a strong adhesive to the finger covering while the other external side of the bilayered adhesive patch has a layer of pressure sensitive adhesive.

4 Claims, 11 Drawing Sheets

PROSTHODONTIC TOOL AND METHOD FOR PLACING AND FITTING CROWNS AND INLAYS

TECHNICAL FIELD

The present invention relates to dental instruments, materials and methods for using them in prosthodontic procedures. More specifically, the present invention relates to a device and kit for facilitating the installation and fitting of artificial tooth crowns and inlays in a patient's mouth.

BACKGROUND ART

Artificial dental crowns cover portions of a tooth surface and are normally fabricated away from the patient's mouth, in a lab, and then installed in the mouth. Full crowns form the entire occlusal surface of a tooth and the sides to the gum line. Partial crowns include onlays which cover the occlusal surface and sometimes portions of the sides, inlays which mainly cover central portions of the occlusal surface and may extend partially onto the sides, and veneers which mainly cover only a side surface of a tooth. For simplicity, all of these artificial elements for covering tooth surfaces will often be referred to as periodontal prosthetics in this document, but it should be recognized that each procedure discussed herein does not necessarily apply to all artificial periodontal prosthetics.

In the field of fixed prosthodontics, the proper placement and adjustment of artificial crowns has always been a cumbersome and risky because when a dental assistant passes the crown back and forth with the dentist, during process of loading the cement in to the crown, there is an increased likelihood of dropping the crown. Further, placing and adjusting the crowns frequently necessitated placing several fingers of a dentist's hand within the patient's mouth during the process. This is because as practiced now, the placement and fitting of an artificial tooth crown normally entails the dentist holding onto the crown with fingers of one hand, and then manipulating the crown in the patient's mouth to place, mark, fit and cement the crown. Often, the marking, fitting and cementing requires fingers of the other hand to be placed into the patient's mouth as well.

Proper placement and fitting of the crown is of the highest importance. The interproximal contacts between an artificial crown must not be too tight or the adjacent teeth, which are attached flexibly to the jaw bone by the periodontal ligament, may spread apart and move out of alignment with the other teeth, including the artificially crowned tooth. Further, too tight of an interproximal contact may prevent the patient from being able to floss between the crowned tooth and the adjacent teeth, which could lead to gum disease and tooth decay. The contact fit must also not be too loose or the ensuing space between the artificially crowned tooth and the adjacent teeth will allow food and particulate matter to collect. The ideal fit is somewhere between a tight and loose fit, with light contact between the artificial crown or inlay and the surrounding teeth desired.

Patients often experience discomfort resulting from the introduction of multiple fingers into their mouth during the process of fitting an artificial crown. The dentist often has two fingers of one hand holding the crown and two fingers of the other hand holding and placing a testing ribbon, all in the mouth of the patient at the same time. Further, the fitting process is made difficult because of the tight quarters and the necessity of having so many fingers in the patient's mouth. The dentist not only has a difficult time maneuvering the crown into place, especially when the tooth being crowned is in the rear of the mouth, but the dentist's view of the mouth is often blocked.

Another problem which arises when the crowns are fitted by hand is contamination of the crown cement by substances on the dentist's latex gloves. Materials on the gloves such as zinc stearate, talc, corn starch and other substances which the manufacturers place on the gloves to keep them from sticking to each other act as contaminants in the cement. Further, phosphoric acid and other chemicals such as eugenol in the cementing agent can dissolve or weaken latex gloves which come into contact with them. This creates a greater risk that a breach in the gloves will occur, possibly resulting in exposure of contaminants between the dentist and patient.

The placement of an artificial crown for cementing or fitting has been tried in another fashion. Sometimes wax, clay, or clay-like materials have been used to adhere the artificial crown to a wooden, plastic or metal stick, such as the device described in U.S. Pat. No. 5,181,755. The artificial crown is then set onto the tooth as directed by the stick. This method is troublesome because it is often difficult to accurately position a crown at the end of an extremely small stick and because the wax or clay material is often very soft and not always very sticky, all of which makes it difficult to adjust, place, and release the crown.

Thus, there is a need for an effective, yet less cumbersome, means for placing and fitting artificial tooth crowns and other periodontal prosthodontics in a patient's mouth.

SUMMARY OF THE INVENTION

It is an object of the present invention to provide a device and method for aiding the placement and fitting of periodontal prosthodontics, such as, but not limited to, a replacement crown, in a patient's mouth.

It is another object of the present invention to provide a device and method for aiding the placement and fitting of periodontal prosthodontics comprising a finger covering having an attached bilayered adhesive patch.

It is yet another object of the present invention to provide the above device wherein the attached bilayered adhesive patch comprises two separable layers joined together by a light adhesive and at least one layer of adhesive for picking up periodontal prosthodontics.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. § 112, paragraph 6 to define the invention. To the contrary, if the provisions of 35 U.S.C. § 112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. § 112, paragraph 6. Moreover, even if the provisions of 35 U.S.C. § 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

The present disclosure provides a device and system for placing and fitting periodontal prosthetics, such as, but not limited to, replacement crowns, inside a patient's mouth using a system containing a finger cover and a bilayered adhesive patch.

Figure 1:
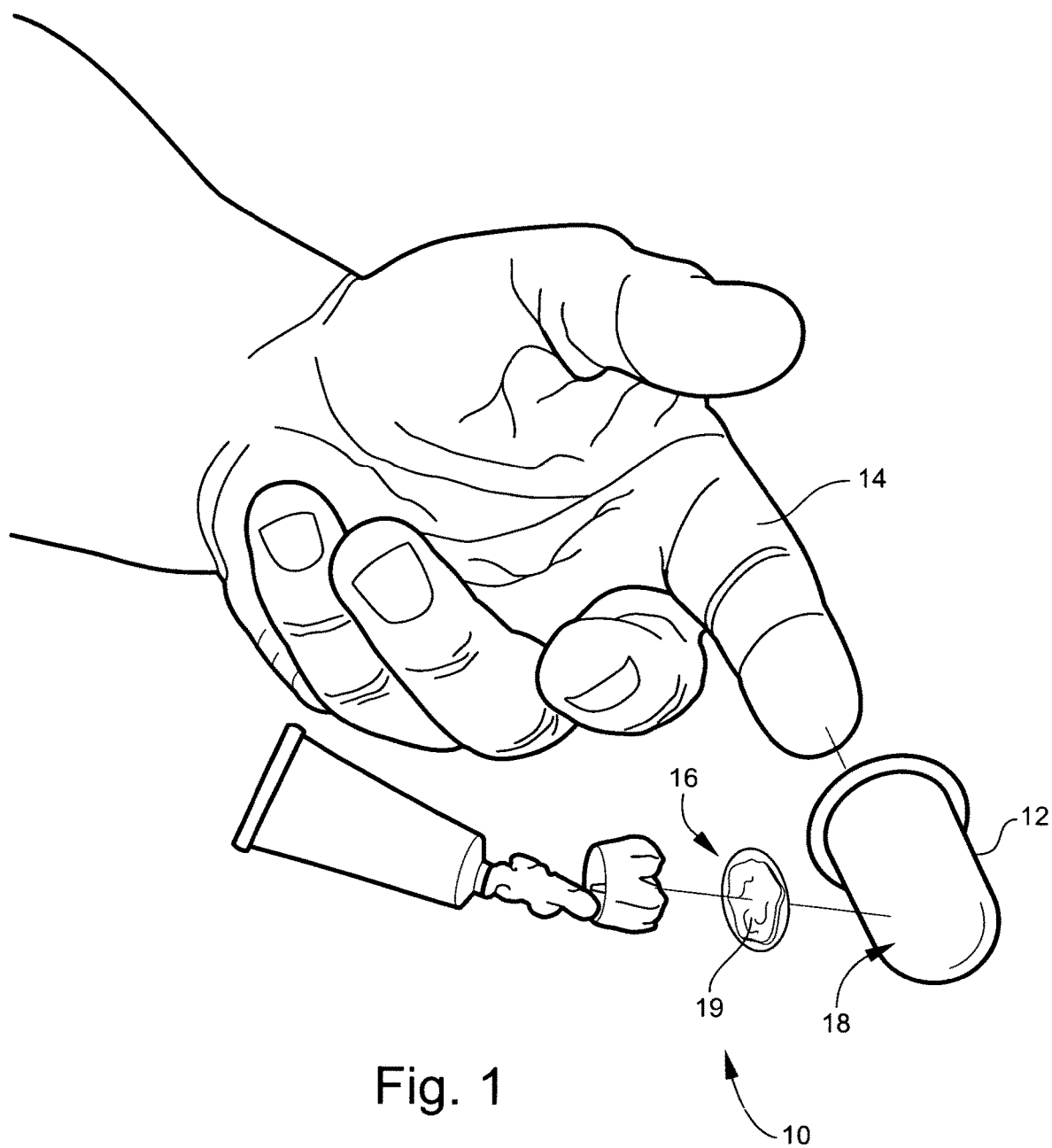
FIG. 1 is an exploded perspective drawing of a preferred embodiment of the device wherein a bilayered adhesive patch is attached directly onto the finger covering.

FIG. 1 illustrates a preferred embodiment of a device 10 according to the present invention. The device 10 comprises a finger covering 12, such as a sterile finger cot, into which a user's finger 14 may be inserted, and an attached bilayered adhesive patch 16. Alternate embodiments of the finger covering 12, include, but are not limited to, a glove, a rigid band of material, a flexible band of material, or any other sterile covering that would create the necessary semi-planar surface 18 needed to securely attach a bilayered adhesive patch 16.

In the preferred embodiment, illustrated in FIG. 1, a bilayered adhesive patch 16 is attached with a strong adhesive to the semi-planar surface 18 on the finger covering 12 so that one side 19 of the bilayered adhesive patch 16 remains exposed.

Figure 2:
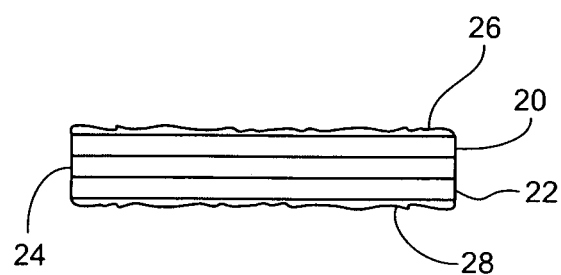
FIG. 2 is a cut away view of a bilayered adhesive patch.
Figure 3:
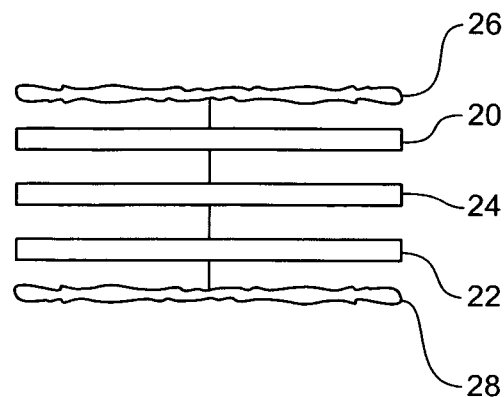
FIG. 3 is an exploded cut away view of a bilayered adhesive patch.
Figure 4:
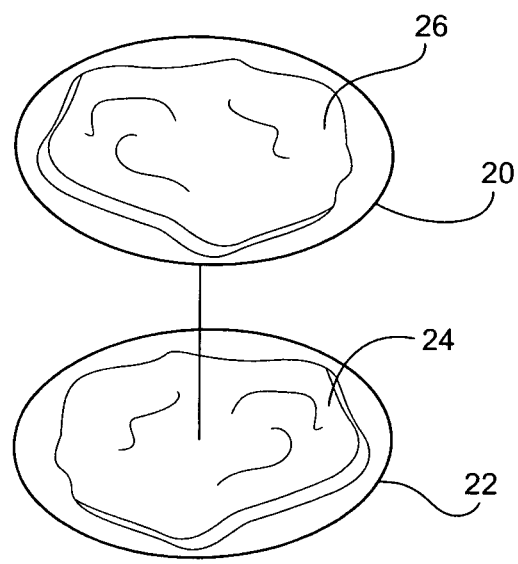
FIG. 4 is an exploded view of a bilayered patch.

As illustrated in FIG. 2, FIG. 3 and FIG. 4, a bilayered adhesive patch 16 comprises a first and a second flat separable layers, 20 and 22, respectively, joined together by a joint adhesive 24. Both the first layer 20 and the second layer 22 include an adhesive side, 26 and 28, respectively. The adhesive sides, 26 and 28, have a pressure activated adhesive surface which face externally. The adhesive sides, 26 and 28, of the two layers, 20 and 22, face outward while the joint adhesive 24 forms a light separable attachment between the two layers 20, and 22 on the internal facing sides.

Figure 5:
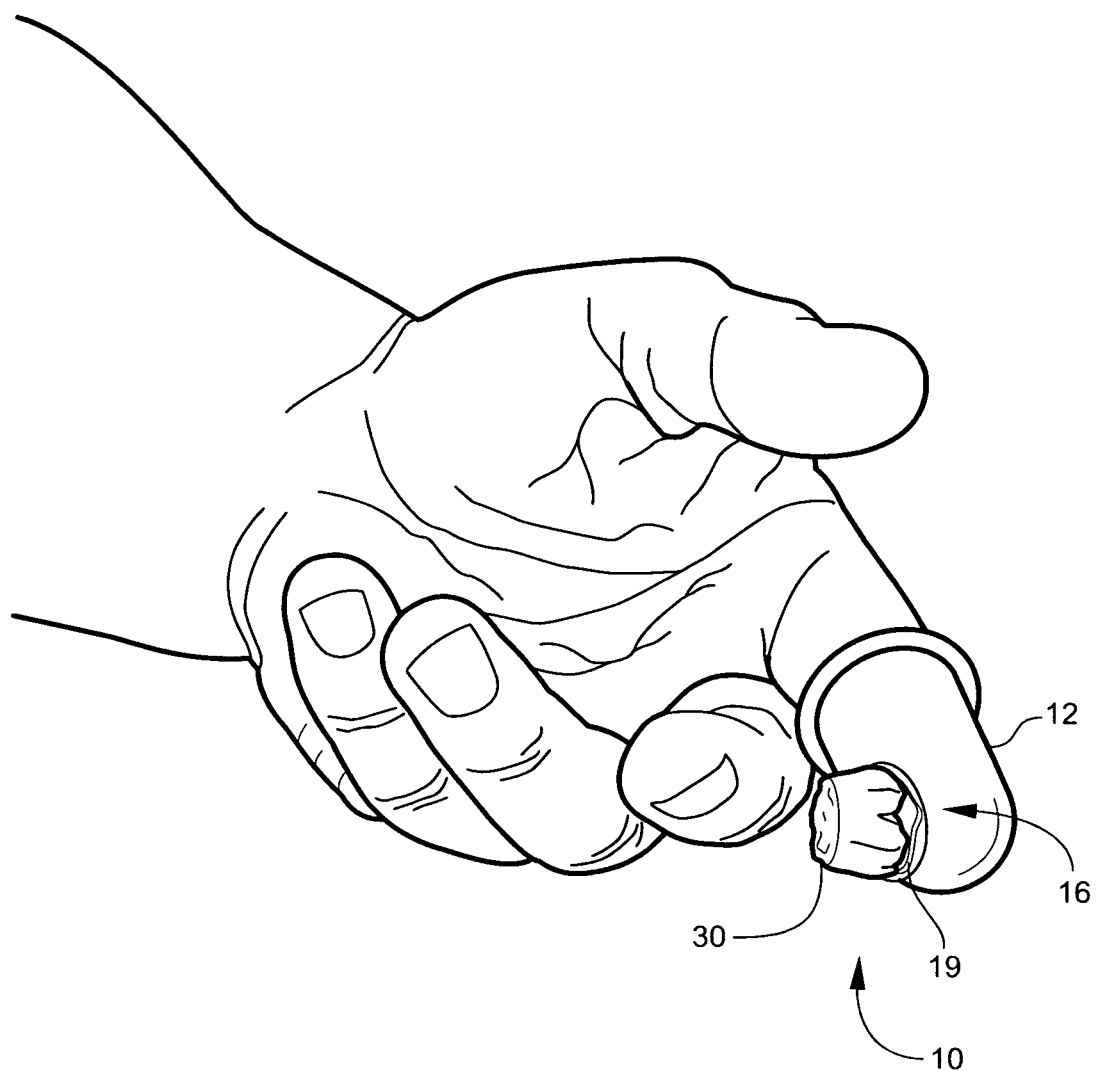
FIG. 5 is a perspective drawing of an embodiment of the device with a periodontal prosthetic adhered to a bilayered adhesive patch.

FIG. 5 illustrates the same preferred embodiment 10 as illustrated in FIG. 1 with a periodontal prosthetic 30 adhered to the bilayered adhesive patch 16. To insert the periodontal prosthetic 30 into a patient's mouth the finger covering 12 with the attached adhesive patch 16 is pressed onto a portion of the periodontal prosthetic 30 creating an adhesive bond between the periodontal prosthetic 30 and the exposed adhesive surface 19 of the bilayered adhesive patch 16. When the finger covering 12 is lifted, the bilayered adhesive patch 16 remains adhered to the sterile semi-planar surface 18 of the finger covering 12 and the periodontal prosthetic 30 remains adhered to the exposed side 19 of the bilayered adhesive patch 16.

Figure 14:
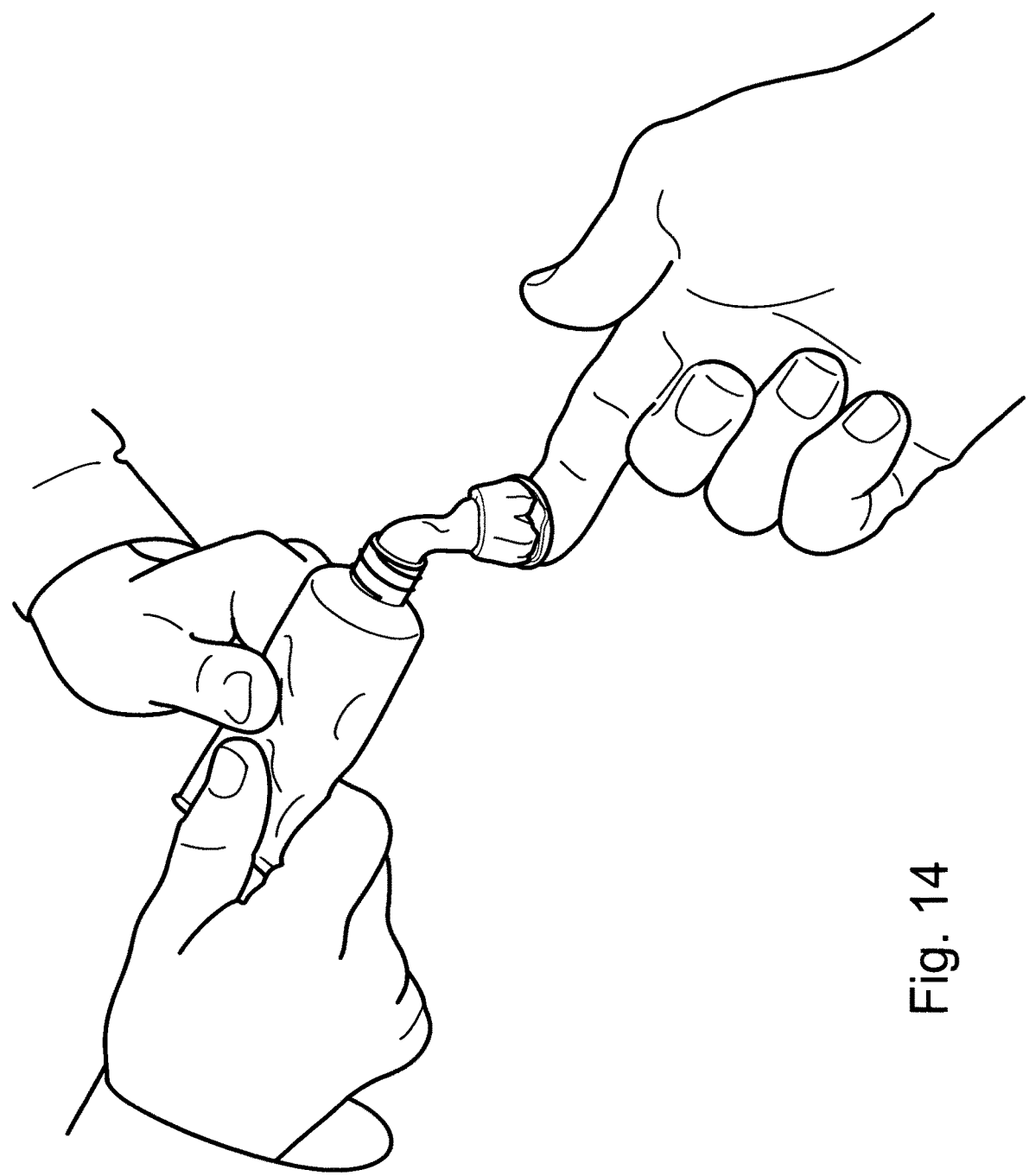
FIG. 14 illustrates an assistant filling a periodontal prosthetic with dental cement.

FIG. 14 illustrates that once the periodontal prosthetic 30 is attached to the bilayered adhesive patch 16, dental cement is added to the base of the periodontal prosthetic.

Figure 6:
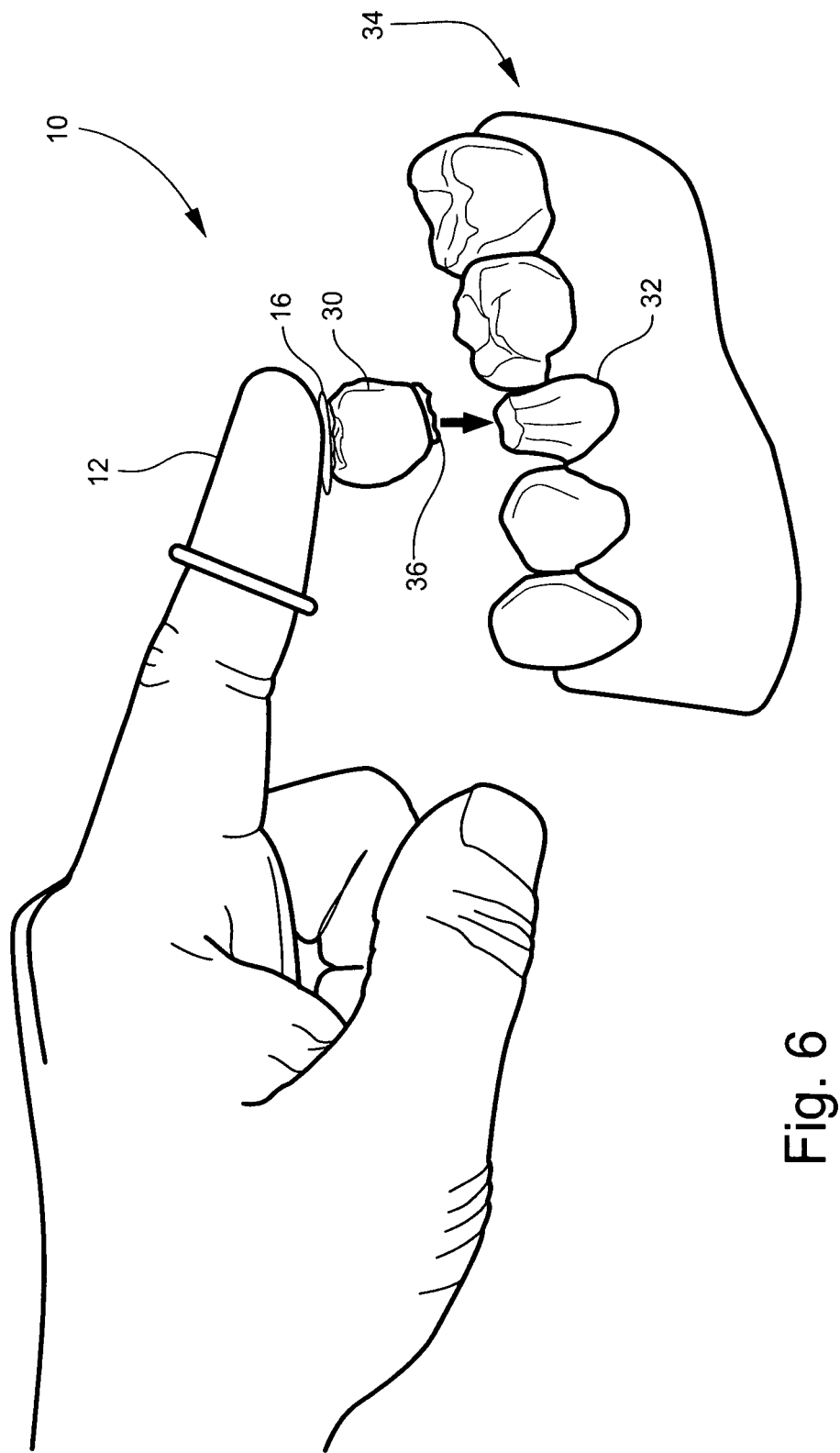
FIG. 6 is a perspective drawing of an embodiment of the device inserting a periodontal prosthetic into a patient's mouth.

FIG. 6 demonstrates the same preferred embodiment 10 inserting the periodontal prosthetic 30 onto a damaged tooth 32. Using the finger 10 inside the finger covering 12, the periodontal prosthetic 30 is placed and fitted inside the patient's mouth 34 where it is installed with a permanent adhesive 36 such as dental cement.

Figure 7:
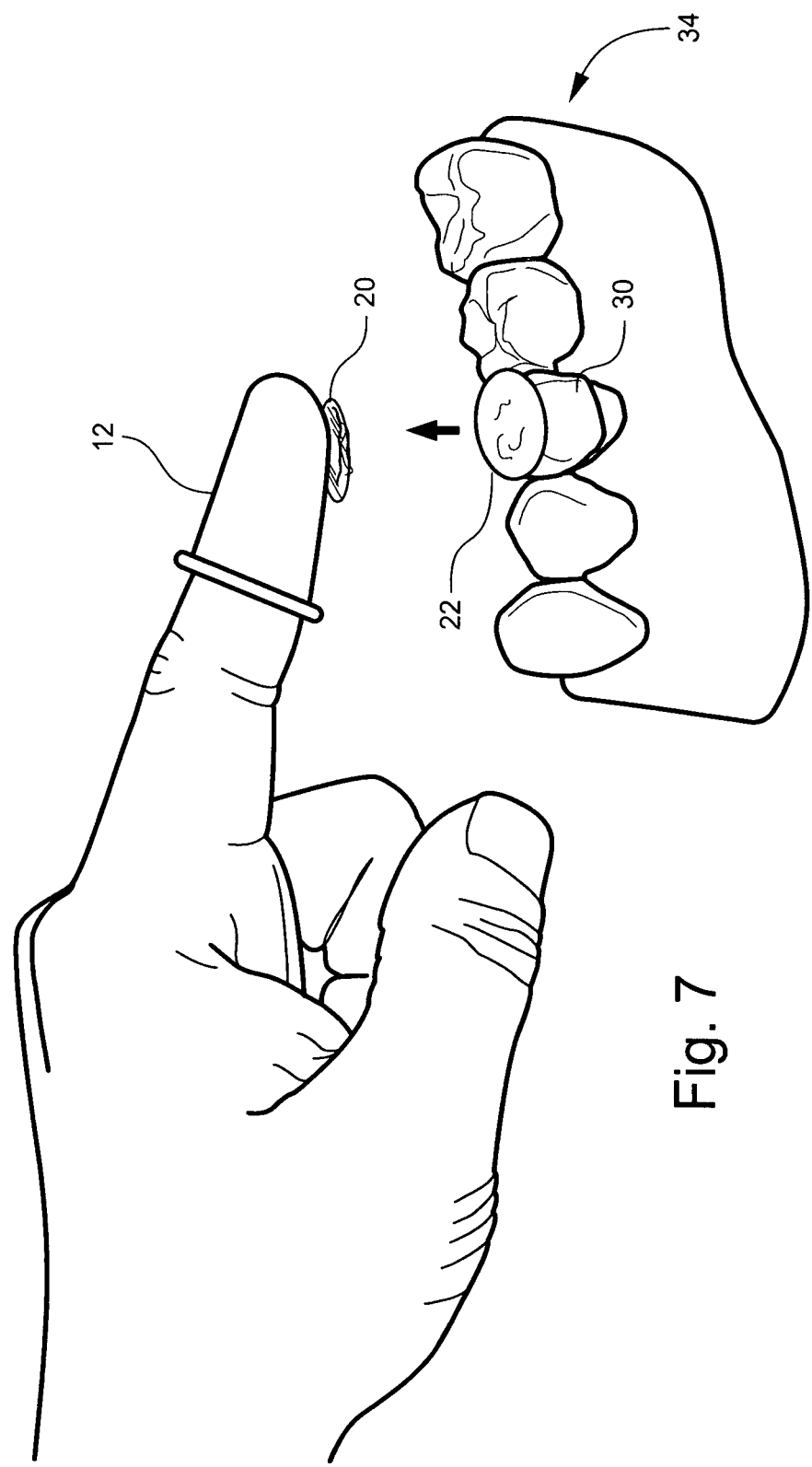
FIG. 7 is a perspective drawing of an embodiment of the device after insertion of a periodontal prosthetic into a patient's mouth.

As illustrated in FIG. 7 when the finger 10 is removed after installation of the periodontal prosthetic 30 the bilayered adhesive patch 16 separates at the joint adhesive 24 of the first and second layers, 20 and 22, respectively, leaving the periodontal prosthetic 30 in place inside the patient's mouth 34 with one layer 22 of the bilayered adhesive patch 16 still connected to the periodontal prosthetic 30 and the second layer 20 of the adhesive patch 16 still adhered to the finger covering 12. The layer 22 of adhesive patch 16 remaining on the patients attached periodontal prosthetic 30 can be removed immediately, later, or allowed to dissolve naturally.

Figure 8:
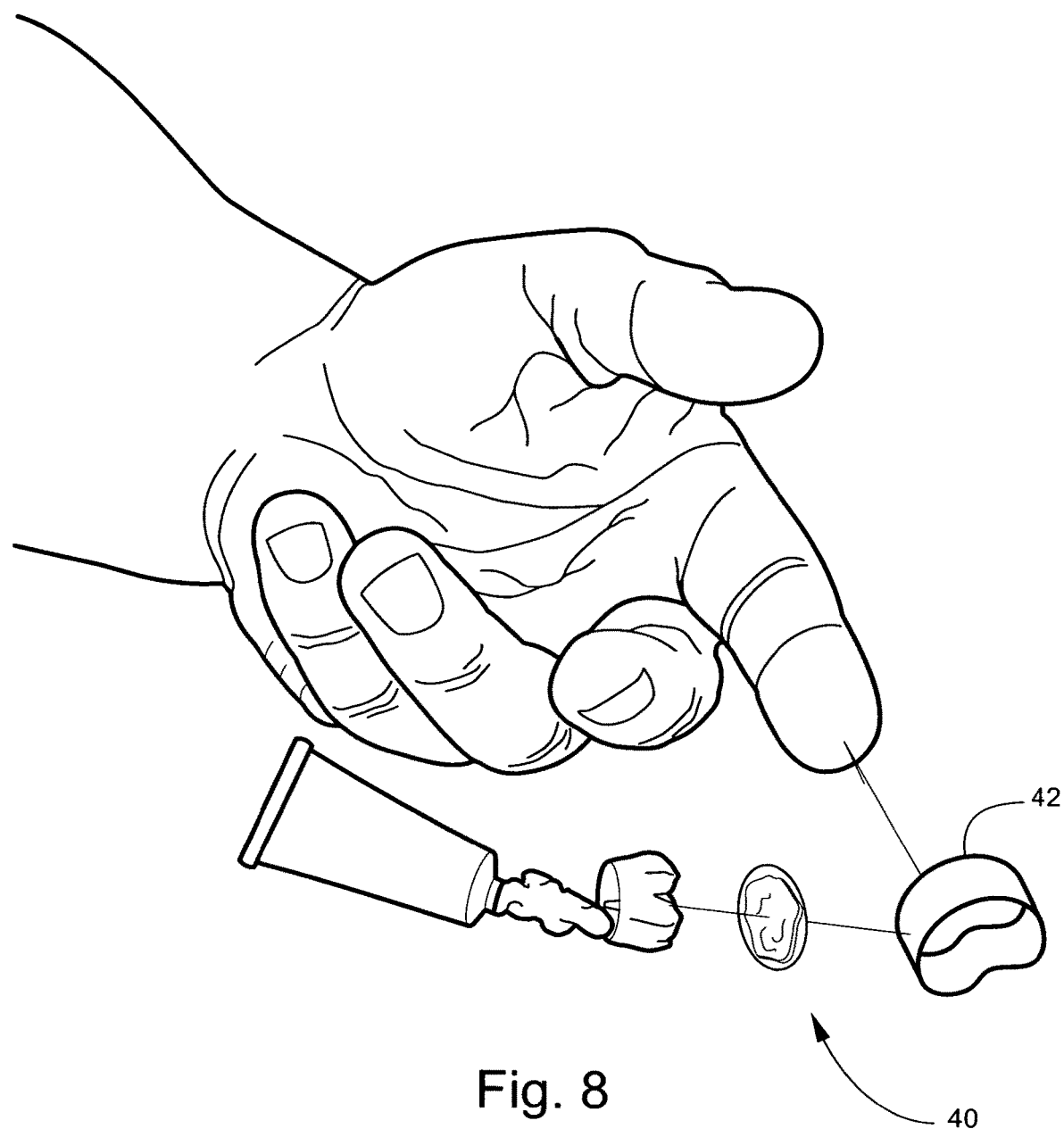
FIG. 8 is a perspective drawing of an alternate embodiment featuring a modified finger covering
Figure 9:
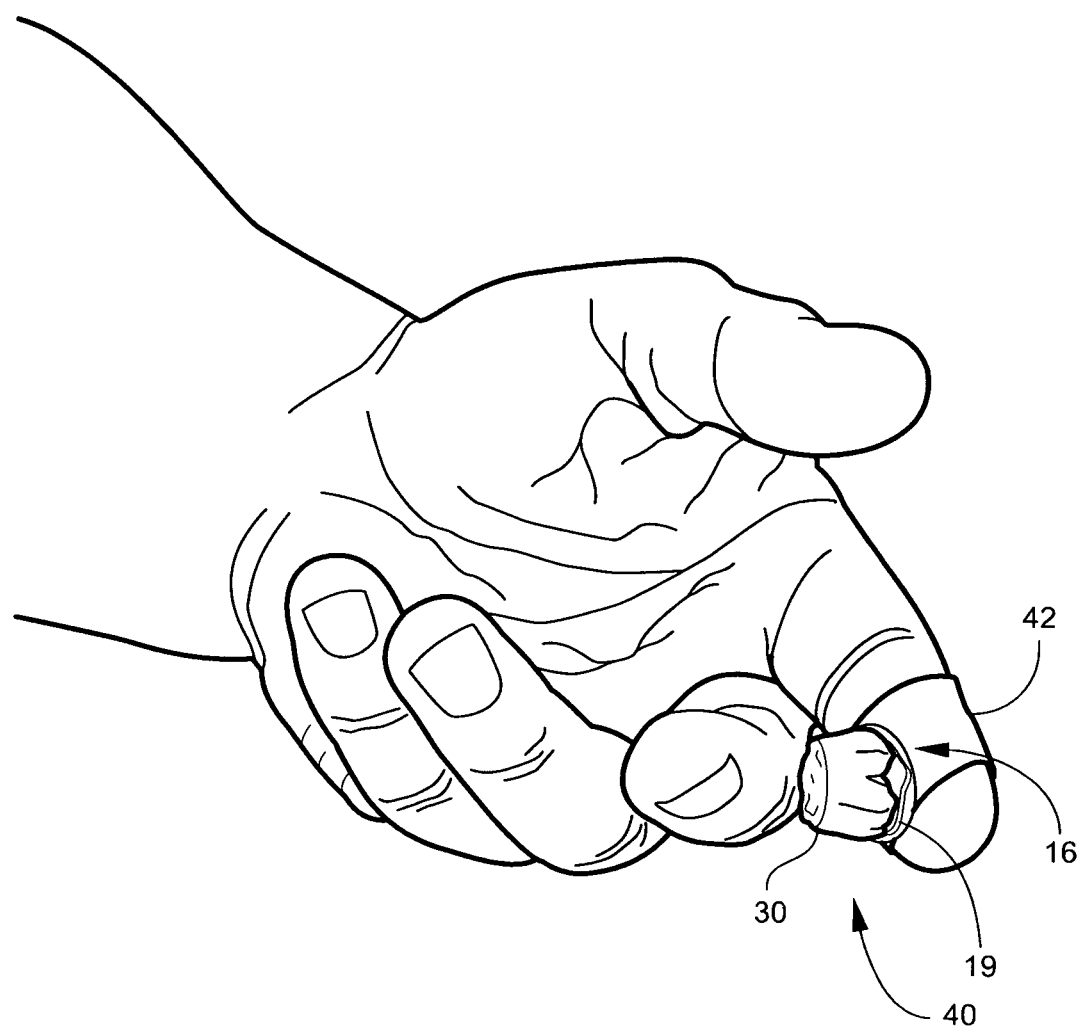
FIG. 9 is a perspective drawing of an alternate embodiment of the device featuring a modified finger covering with a periodontal prosthetic adhered to a bilayered adhesive patch.
Figure 10:
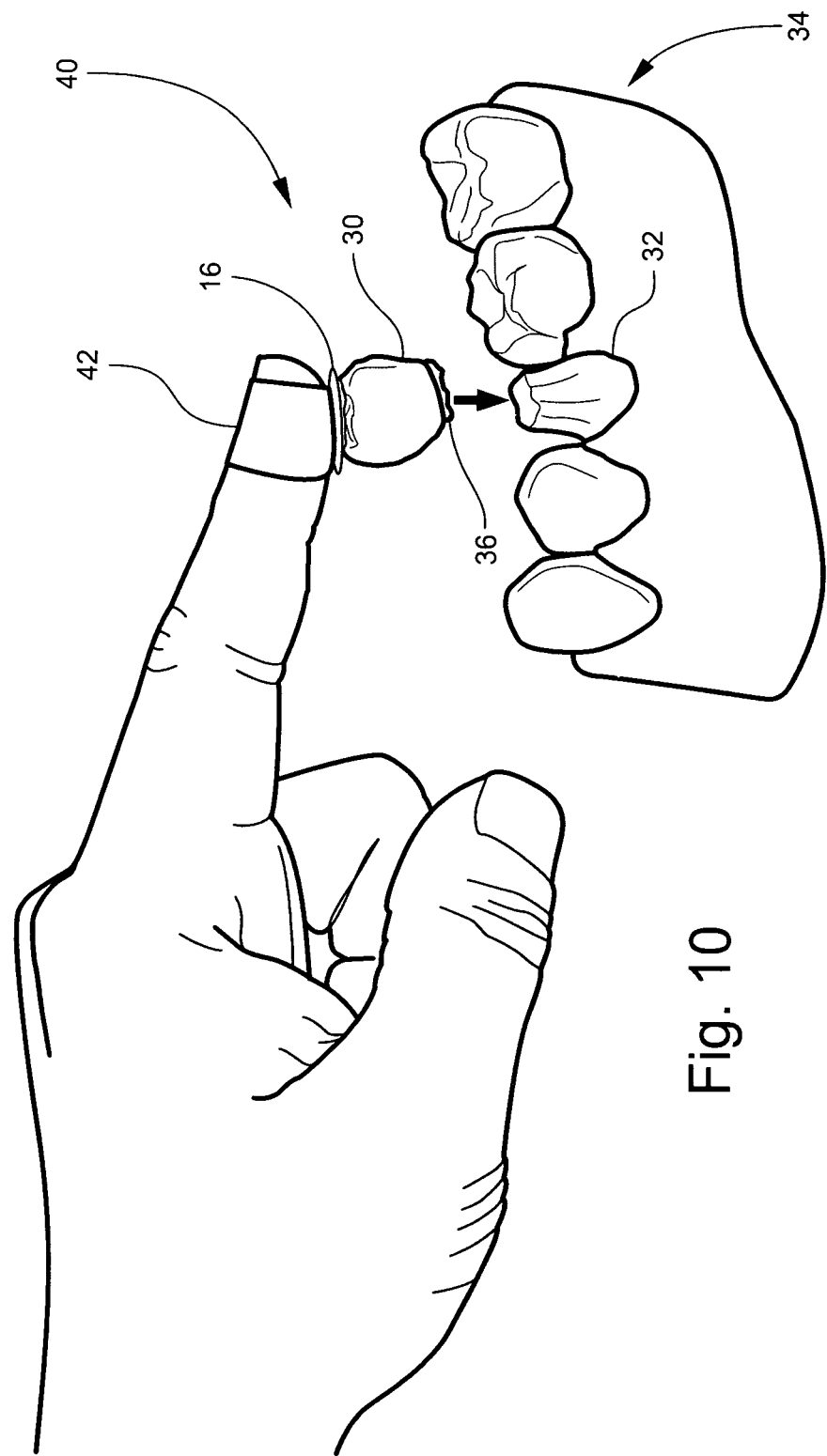
FIG. 10 is a perspective drawing of an alternate embodiment of the device featuring a modified finger covering inserting a periodontal prosthetic into a patient's mouth.
Figure 11:
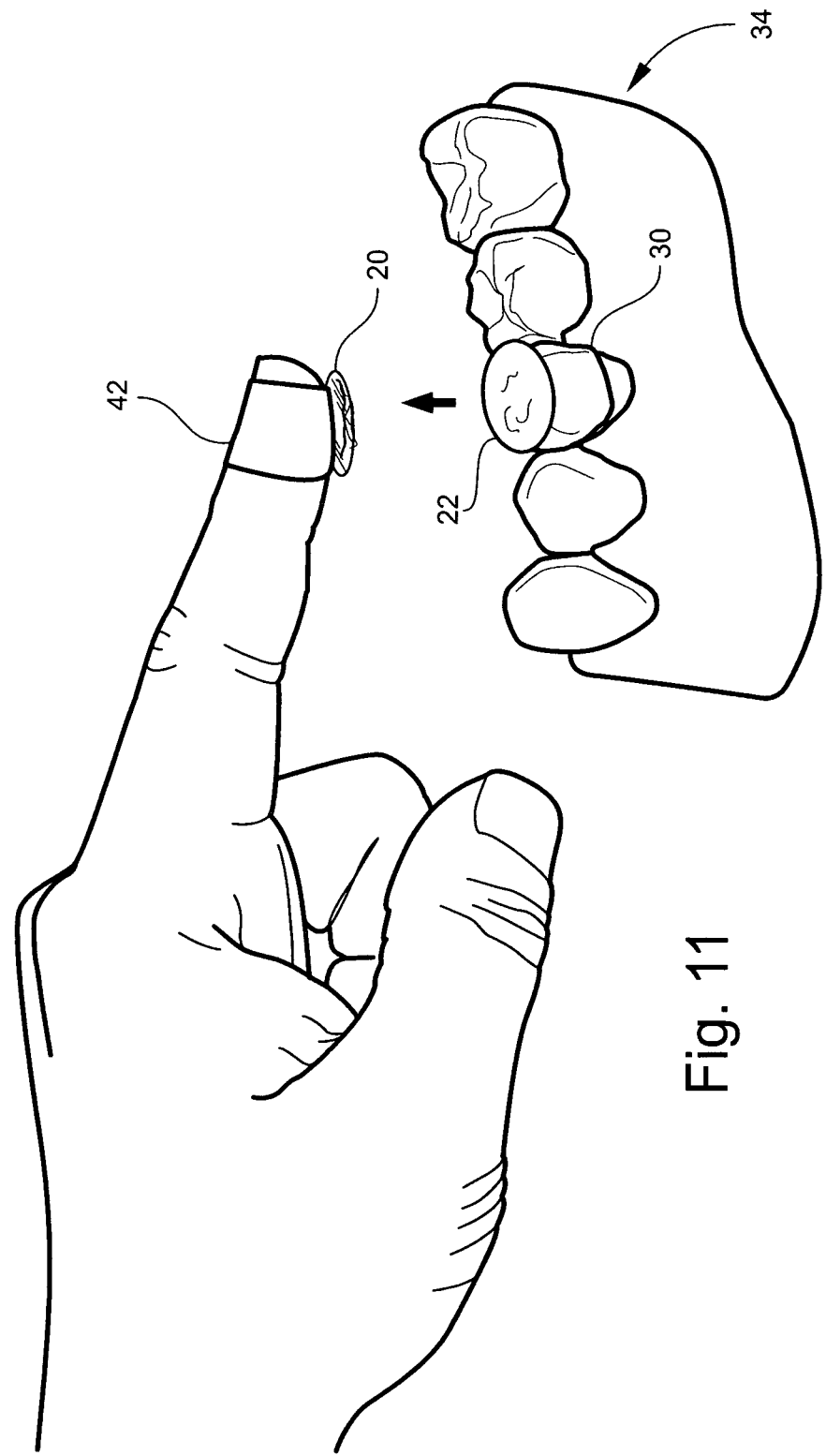
FIG. 11 is a perspective drawing of an alternate embodiment of the device featuring a modified finger covering after insertion of a periodontal prosthetic into a patient's mouth.

FIG. 8, FIG. 9 and FIG. 10 illustrate an alternate embodiment 40 wherein the finger covering 12 is a band of sterile material 42 instead of a finger cot or glove.

Figure 12:
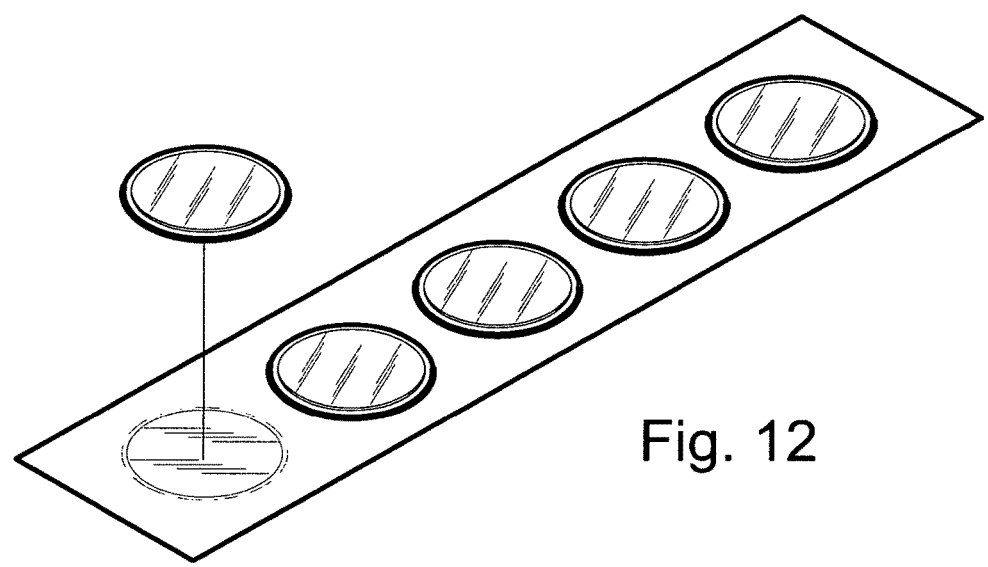
FIG. 12 is an exploded perspective drawing of an alternate embodiment of the device featuring a separately stored bilayered adhesive patch.
Figure 13:
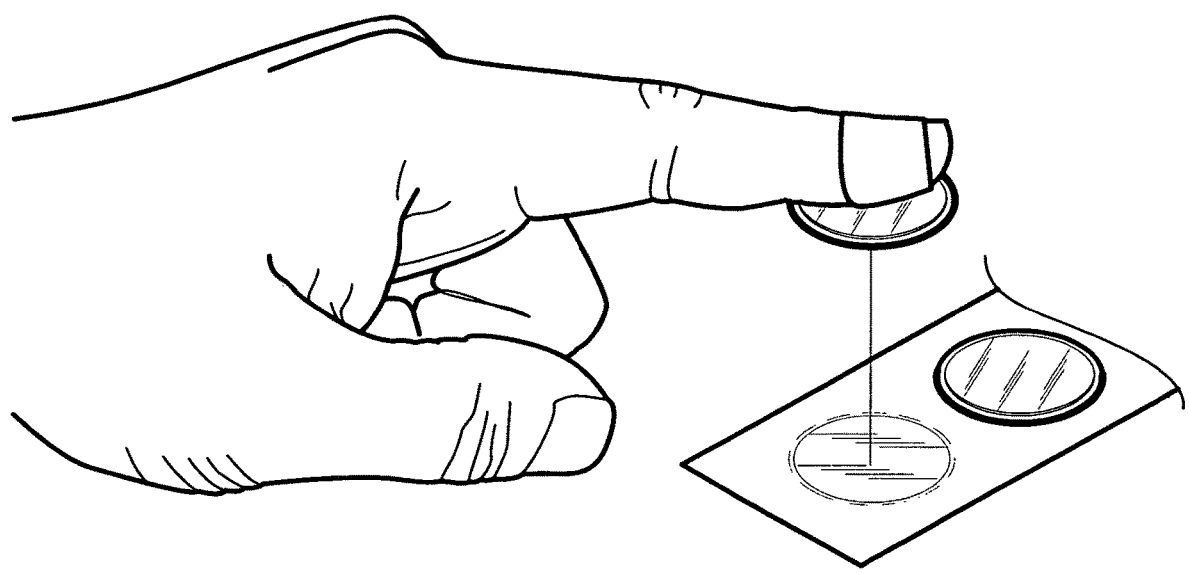
FIG. 13 is a perspective drawing of an alternate embodiment of the device featuring a separately stored bilayered adhesive patch being removed from a release storage strip.

FIG. 12 and FIG. 13 display a kit 90 that features the finger covering 12 and the bilayered adhesive patches 16 stored separately. When this embodiment is used, the finger covering 12 is placed over a finger 14 creating a sterile semi-planar surface 18 on which the bilayered adhesive patch 16 can be adhered. The bilayered adhesive patch 16 is stored on a release strip 50 consisting of a release surface 52 from which the patches 16 can be easily removed. The bilayered adhesive patch 16 is stored with one adhesive layer 26 facing the release surface 52 and the other adhesive layer 28 facing away from the release surface 52. To remove the patch 16 from the release strip 50, the sterile semi-planar surface 18 of the finger covering 12 is pressed on the exposed adhesive layer 28 of the bilayered adhesive patch 16 creating an adhesive bond between the bilayered adhesive patch 16 and the sterile planar surface 18. When the semi-planar surface 18 is lifted, the adhesive patch 16 remains attached to the sterile semi-planar surface 18 and is removed from the release strip 50 with both layers, 26 and 28, intact.

The described features, structures, or characteristics of the invention may be combined in any suitable manner in one or more embodiments. In the above description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

While the invention is described through the above-described exemplary embodiments, it will be understood by those of ordinary skill in the art that modifications to, and variations of, the illustrated embodiments may be made without departing from the inventive concepts disclosed herein. For example, although some aspects of making and using Applicant's periodontal prosthetic placement system have been described, those skilled in the art should readily appreciate that functions, operations, decisions, etc. of all or a portion of each step herein described may be combined, separated or performed in other orders. In addition, although some specific materials have been described, the disclosed methods and structures may be used with other materials that have similar properties or effects. Furthermore, disclosed aspects, or portions of these aspects, may be combined in ways not listed above. Accordingly, the invention should not be viewed as being limited to the disclosed embodiments.

The present invention may be embodied in other specific forms without departing from its spirit or essential characteristics. The described implementations are to be considered in all respects only as illustrative and not restrictive. The scope of the invention should, therefore, be determined not with reference to the above description, but instead should be determined with reference to the pending claims along with their full scope or equivalents, and all changes which come within the meaning and range of equivalency of the claims are to be embraced within their full scope.

What is claimed is:

1. A kit for preparing, fitting and placing periodontal prosthodontics comprising:
   a. at least one single finger covering;
   b. a periodontal prosthetic; and
   c. at least one bilayered adhesive patch comprising:
      a first layer and a second layer, the first and second layers being separably joined by a weak adhesive configured to form a light separable attachment between the first and second layers, wherein:
      (1) one external side of the first layer is attached by a strong adhesive to the single finger covering, the strong adhesive being configured to keep the first layer attached to the single finger covering while the first and second layers are being separated, and
      (2) an external side of the second layer has a layer of pressure sensitive adhesive wherein the pressure sensitive adhesive is coupled to the periodontal prosthetic for placing inside a mouth such that when the single finger covering is removed from the periodontal prosthetic, the two layers separate and the second layer with the pressure sensitive adhesive remains on the periodontal prosthetic and the first layer remains on the single finger covering.

2. The kit according to claim 1 wherein the single finger covering is a finger cot, a rigid band or a flexible band.

3. A kit for preparing, fitting and placing periodontal prosthodontics comprising:
   a. at least one single finger covering;
   b. a periodontal prosthetic;
   c. dental cement; and
   d. at least one bilayered adhesive patch comprising:
      a first layer and a second layer, the first and second layers being separably joined by a weak adhesive configured to form a light separable attachment between the first and second layers, wherein:
      (1) one external side of the first layer is attached by a strong adhesive to the single finger covering, the strong adhesive being configured to keep the first layer attached to the single finger covering while the first and second layers are being separated, and
      (2) an external side of the second layer has a layer of pressure sensitive adhesive wherein the pressure sensitive adhesive is coupled to the periodontal prosthetic for placing inside a mouth wherein the periodontal prosthetic is secured with the dental cement such that when the single finger covering is removed from the periodontal prosthetic, the two layers separate and the second layer with the pressure sensitive adhesive remains on the periodontal prosthetic and the first layer remains on the single finger covering.

4. The kit according to claim 3 wherein the single finger covering is a finger cot, a rigid band or a flexible band.

* * * * *